(12) United States Patent
Carvalho et al.

(10) Patent No.: US 8,335,160 B2
(45) Date of Patent: Dec. 18, 2012

(54) FLOW SAMPLING WITH TOP TALKERS

(75) Inventors: Allwyn Carvalho, Alameda, CA (US);
Yakov Teplitsky, Cupertino, CA (US);
Shariar Rahman, Sa Jose, CA (US);
Manoj Tiwari, Santa Clara, CA (US);
Vamsidhar Valluri, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 373 days.

(21) Appl. No.: 12/750,499

(22) Filed: Mar. 30, 2010

(65) Prior Publication Data
US 2011/0242994 A1    Oct. 6, 2011

(51) Int. Cl.
H04J 1/16 (2006.01)
H04J 3/14 (2006.01)
H04L 1/00 (2006.01)
H04L 12/26 (2006.01)

(52) U.S. Cl. ............ 370/235.1; 370/235; 370/229

(58) Field of Classification Search ........... 370/229, 370/235, 235.1, 238, 351, 389, 391, 392, 370/393, 395.4, 412, 468; 709/230, 232, 709/233, 234, 235, 238
See application file for complete search history.

(56) References Cited

U.S. PATENT DOCUMENTS

| | | | | |
|---|---|---|---|---|
| 779,131 | A * | 1/1905 | Parsons | 144/118 |
| 5,864,540 | A * | 1/1999 | Bonomi et al. | 370/235 |
| 6,072,781 | A * | 6/2000 | Feeney et al. | 370/282 |
| 6,215,769 | B1 * | 4/2001 | Ghani et al. | 370/230 |
| 6,810,426 | B2 * | 10/2004 | Mysore et al. | 709/234 |
| 7,031,255 | B2 * | 4/2006 | Chiussi et al. | 370/230 |
| 7,065,091 | B2 * | 6/2006 | Shoham et al. | 370/395.41 |
| 7,349,405 | B2 * | 3/2008 | Deforche | 370/395.4 |
| 7,385,924 | B1 | 6/2008 | Riddle | |
| 7,474,668 | B2 * | 1/2009 | Bauman et al. | 370/412 |
| 7,609,636 | B1 * | 10/2009 | Mott | 370/235 |
| 7,688,731 | B2 * | 3/2010 | Haumont et al. | 370/235 |
| 7,809,009 | B2 * | 10/2010 | Tatar et al. | 370/419 |
| 7,813,283 | B1 * | 10/2010 | Dalal | 370/235 |
| 7,864,791 | B2 * | 1/2011 | Tatar et al. | 370/419 |

(Continued)

FOREIGN PATENT DOCUMENTS

EP    1603273    12/2005

(Continued)

OTHER PUBLICATIONS

Netflow, Wikipedia, http://en.wikipedia.org/wiki/Netflow, Mar. 17, 2010 (Date of Access: Mar. 18, 2010) 5 pgs.

(Continued)

*Primary Examiner* — Kwang B Yao
*Assistant Examiner* — Adam Duda
(74) *Attorney, Agent, or Firm* — Blakely Sokoloff Taylor & Zafman, LLP (57) ABSTRACT

An improved network flow sampling apparatus and corresponding method more intelligently selects flows to be reported beyond random flow or packet sampling intervals. Evaluation of flows selects top talkers or heavy hitters as important flows that most impact traffic and therefore should be reported. Top talkers are flows defined based on a customized definition according to, for example, number of packets in a flow, number of bytes in a flow, or bandwidth consumed by a flow. An external collector can thus proceed with traffic profiling or other flow monitoring purposes with a more intelligently determined network flow sample.

8 Claims, 9 Drawing Sheets

U.S. PATENT DOCUMENTS 7,986,629 B1 * 7/2011 Ferguson et al. ............. 370/235
2007/0237079 A1 10/2007 Whitehead

FOREIGN PATENT DOCUMENTS

EP         1973271         9/2008
WO    WO-2008122505       9/2008

OTHER PUBLICATIONS

IP Flow Information Export (ipfix), IPFIX@IETF, http:/www.ietf.org/dyn/wg/charter/ipfix-charter.html, Internet Engineering Task Force, Sep. 29, 2009 (Date of Access: Mar. 18, 2010), 4 pgs.

Packet Sampling (psamp), PSAMP@IETF—http://www.ietf.org/wg/concluded/psamp.html, Packet Sampling (psamp), Nov. 21, 2008 (Date of Access: Mar. 18, 2010), 3 pgs.

Information Model for IP Flow Information Export—http://www.ietf.org/rfc/rfc5102.txt, Network Working Group, Jan. 2008, 160 pgs.

Estan, C., et al., "New Directions in Traffic Measurement and Accounting: Focusing on the Elephants, Ignoring the Mice", ACM Transactions on Computer Systems, vol. 21, No. 3, (Aug. 2003), pp. 270-313.

Kobayashi, A., et al., "IPFIX Mediation: Problem Statement; draft-ietf-ipfix-mediators-problem-statement-09.txt", Internet Engineering Task Force, IETF; StandardWorkingDraft, Internet Society (ISOC) 4, No. 9, (Mar. 27, 2010), pp. 1-30.

Lu, Y., et al., "ElephantTrap: A low cost device for identifying large flows", 15th Annual IEEE Symposium on High-Performance Interconnects (HOTI 2007), (Aug. 2007), pp. 99-108.

Peluso, L., et al., "Flow Selection Techniques; draft-ietf-ipfix-flow-selection-tech-01.txt", Internet Engineering Task Force, IETF; StandardWorkingDraft, Internet Society (ISOC) 4, No. 1, (Mar. 7, 2010), pp. 1-24.

* cited by examiner

FLOW SAMPLING WITH TOP TALKERS

BACKGROUND

1. Field

Embodiments of the invention relate to the field of flow monitoring; and more specifically, to a more intelligent and dynamic sampling of network flows.

2. Background

Network flows are monitored for a variety of purposes, including usage-based accounting, traffic profiling, traffic engineering, attack or intrusion detection, and QoS (quality of service) monitoring. One method of monitoring flows is performed by reporting on each and every flow. While this implementation provides an accurate and complete picture of network traffic, it requires a large number of resources, including memory and CPU (central processing unit) usage on the forwarding plane of the network device, backplane bandwidth to send flow records to the control plane of the network device and also out to an external collector, memory and CPU usage on the control plane of the network device, network bandwidth consumption due to heavy communication with the external collector, and memory and CPU usage on the external collector. Reporting on each and every flow is not feasible in high-speed environments.

An alternative to complete reporting of all flows is to report on a sample of the flows. For example, sampling can be done in packet intervals. Packet interval sampling takes a random selection of a subset of packets, e.g., by reporting on 1 out of every 1,000 packets received on a network device. However, there are various drawbacks of packet interval sampling. One drawback is that this sampling does not provide a precise number of packets in a flow. If the number of packets reported is 1,000, one can only assume that there were approximately 1,000,000 packets in the flow, but it is not an exact count. Another drawback is that packet interval sampling tends to report longer flows rather than shorter flows because if a flow contains fewer than 1,000 packets, a sample may not necessarily be taken from this flow. For these reasons, packet interval sampling is not ideal.

An alternative to packet interval sampling is flow interval sampling. Flow interval sampling takes a random selection of a subset of flows, e.g., by reporting 1 out of every 5 flows, and reporting the selected flows in their entirety. This sampling resolves the aforementioned drawbacks of packet interval sampling. However, with both packet interval sampling and flow interval sampling, the reporting is not as complete as monitoring and reporting on each and every flow.

SUMMARY

The invention sets forth various algorithms for sampling flows more intelligently than random sampling based on flow or packet intervals. One embodiment employs a combination of random flow sampling and top talker flow sampling. The reporting result is a fixed number of flows from the random sampling (e.g., 10 random flows out of every 100 flows) and a variable number of flows depending on how many flows meet the predetermined top talker criteria. A method of a network device in this embodiment comprises receiving packets and determining the flows from the packets. Each of the flows is a stream of the packets sharing a group of packet characteristics. Then the network device identifies a sample of the flows and exports information on the sample of the flows to an external collector for further analysis or processing. The sample of the flows includes two parts. The first subset of the sample is determined by flow interval sampling and a second subset of the samples represents top talkers determined by a predetermined criteria. Accordingly, the number of flows reported in the second subset depends on stringency of the predetermined criteria defining top talkers, which are the flows that most impact traffic of the network device. Reporting on the top talkers provides information on major flows that may be missed when reporting on flows only based on flow interval sampling.

The network device that implements this embodiment contains a forwarding plane and a control plane. The forwarding plane includes a packet receiving module to receive packets and determine the flows from the packets, a flow sampling module to identify a first subset of the flows received from the packet receiving module based on flow interval sampling and to report information on the flows in the first subset to the interval-based flow exporter upon the flows expiration, and a flow analysis module to analyze each of the flows received from the packet receiving module for major characteristics defined by a predetermined criteria to identify a second subset of the flows as top talkers and to report information on the flows in the second subset to the top talker flow exporter upon the flows' expiration. The control plane includes an interval-based flow exporter to export the information on the flows in the first subset from the flow sampling module to an external collector and a top talker flow exporter to export the information on the flows in the second subset from the flow analysis module to the external collector.

Another embodiment employs flow sampling based on bandwidth utilization. An initial number N of flows is determined as the sample per time interval and evaluated on whether its bandwidth utilization exceeds a threshold value, e.g., 70% of total bandwidth captured by N flows. If these N flows do not capture more than 70% of the total bandwidth, then two things are done. (a) a small percentage, for example 10% of these N flows, which are the lowest bandwidth contributors based on the life of the flow are pruned, and (b) N is increased for the next time interval. If the bandwidth of these N flows exceeds the threshold, then N is maintained for the next time interval. The reporting result is N flows that aim to capture most of the bandwidth. A method of a network device in this embodiment includes receiving packets at a forwarding plane of the network device during a sampling time interval, creating a flow descriptor for each of the flows, and including flow information in only a subset of the flow descriptors. Values are obtained by measuring total bandwidth consumed by the flows represented by all the flow descriptors during the sampling time interval and total bandwidth consumed by the flows represented by the subset of the flow descriptors during the sampling time interval. Dividing the total bandwidth of the flows represented by all the flow descriptors during the sampling time interval by the total bandwidth of the flows represented by the subset of the flow descriptors during the sampling time interval upon expiration of the sampling time interval results in a bandwidth utilization value and it is determined whether the bandwidth utilization exceeds a threshold value. If so, the network element maintains a number of flow descriptors in the subset of the flow descriptors taken in the sampling time interval for a next sampling time interval. If not, the network element increases the number of flow descriptors in the subset of the flow descriptors taken in the sampling time interval for the next sampling time interval, aiming to achieve a bandwidth utilization that exceeds the threshold value in the next sampling time interval. Flows that expire are reported from the forwarding plane to a control plane of the network device, and then exported to an external collector for further analysis or processing. The flow information reported to the control plane represents a sample of flows that most impact traffic of the network device in terms of bandwidth size.

The network device of the preceding embodiment contains different modules on the forwarding plane and the control plane. The forwarding plane includes a flow descriptor creation module to receive packets at a forwarding plane during a sampling time interval and create a flow descriptor for each of the flows, a total bandwidth tracking module to measure total bandwidth consumed by the flows represented by all the flow descriptors created by the flow descriptor creation module during the sampling time interval, and a sampled bandwidth tracking module to measure total bandwidth consumed by the flows represented by the subset of the flow descriptors created by the flow descriptor creation module during the sampling time interval. To calculate bandwidth utilization, the forwarding plane includes a bandwidth calculation module to divide the total bandwidth of the flows represented by all the flow descriptors measured by the total bandwidth tracking module by the total bandwidth of the flows represented by the subset of the flow descriptors measured by the sampled bandwidth tracking module upon expiration of the sampling time interval to obtain a bandwidth utilization and determine whether the bandwidth utilization exceeds a threshold value. A flow descriptor creation adjustment module maintains a number of flows in the subset of the flows taken in the sampling time interval for a next sampling time interval when the bandwidth utilization exceeds the threshold value and increases the number of flows in the subset of the flows taken in the sampling time interval for the next sampling time interval when the bandwidth utilization does not exceed the threshold value. A flow reporting module reports the flow information represented by the flow descriptors in the subset upon the flows' expiration from the forwarding plane to a control plane. In the control plane, a flow exporter exports the flow information reported to the control plane from the control plane to an external collector.

A further embodiment employs flow sampling based on buckets organized by a top talker criterion. The capacity of all of the buckets combined is capped at a value of M number of flows. If the capacity M has been reached, this embodiment drops one low talker flow to accommodate a new flow. Flows are reported when they expire based on active or inactive timeout and if they meet predetermined top-talking criteria, such as minimum number of packets or bytes. Not all M flows need be reported. The reporting result is a number of flows up to M. If the total number of flows exceeds M, then up to M top talker flows are reported. A method of this embodiment includes receiving a packet at a forwarding plane of the network device, determining whether the packet is part of an existing flow already tracked in one of the plurality of buckets ranging from a least-significant bucket to a most-significant bucket in terms of a predetermined criteria that identifies top talkers. Each of the plurality of buckets sort the flows tracked therein by order of least recently used at a tail of each bucket and most recently used at a head of each bucket. Upon determination that the packet is part of the existing flow already tracked in one of the plurality of buckets, the network device adds the packet to that existing flow and moves that existing flow to the head of a bucket of the plurality of buckets. The bucket for that existing flow is selected based on the predetermined criteria. Upon determination that the packet is not part of any existing flows already tracked in one of the plurality of buckets, the network device determines whether a total number of flows tracked in the plurality of buckets of the forwarding plane has reached a maximum limit and discards a flow from the tail of the least-significant bucket only when the total number of flows in the plurality of buckets of the forwarding plane has reached a maximum limit. The flow is discarded to allow a new flow to be created without causing the total number of flows to exceed the maximum limit and because the flow to be discarded is the least recently used flow in the least-significant bucket. The network device can then create a new flow for the packet at the head of the least-significant bucket. Information is reported on the flows tracked in the plurality of buckets upon the flows' expiration from the forwarding plane to a control plane of the network device and subsequently exported to an external collector for further analysis or processing by the external collector. Reporting only the information on those flows that remain tracked in any of the plurality of buckets by not being discarded upon the flows' expiration ensures that information on the top talkers is reported and also guarantees that information on at least one flow is reported because all flows created by the network device are reported up to the maximum limit.

A network device directed to this embodiment contains the following modules. A forwarding plane of the network device includes a packet receiving module to receive a packet and a flow organizing module having the plurality of buckets. The flow organizing module determines whether the packet is part of an existing flow already tracked in one of the plurality of buckets ranging from a least-significant bucket to a most-significant bucket in terms of a predetermined criteria that identifies top talkers. This module moves, discards, and adds flows to buckets in accordance with the above method. A flow reporting module reports information on the flows tracked in the plurality of buckets upon the flows' expiration from the forwarding plane to a control plane. The control plane includes a flow exporter to export the information on the flows reported to the control plane from the control plane to an external collector for further analysis or processing by the external collector.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network device or element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, palm tops, mobile phones, smartphones, multimedia phones, Voice Over Internet Protocol (VOID) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.). private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g. through one or more core network elements) to other edge network elements, which are coupled to other end stations (e.g., server end stations).

Some network elements include functionality for AAA (authentication, authorization, and accounting) protocols (e.g. RADIUS (Remote Authentication Dial-In User Service), Diameter, and/or TACAS+ (Terminal Access Controller Access Control System). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information, etc.) used during processing of that subscriber's traffic.

Certain network elements (e.g., certain edge network elements) internally represent subscriber end stations (or sometimes customer premise equipment (CPE) such as a residents gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, ATM, etc. A subscriber session can be initiated using a variety of mechanisms: manual provisioning a dynamic host configuration protocol (DHCP), DHCP/client-less internet protocol service (CLIPS), Media Access Control (MAC) address tracking, etc. For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

Certain network elements (e.g., certain edge network elements) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end stations to the network element. These parent circuits may represent physical or logical aggregations of subscriber circuits (e.g., a virtual local area network (VLAN), a private virtual circuit (PVC) (e.g., for Asynchronous Transfer Mode (ATM)), a circuit-group, a channel, a pseudo-wire, a physical port of the network element, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical ports for purposes of bandwidth aggregation and redundancy. Thus, the parent circuits physically or logically encapsulate the subscriber circuits.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

Figure 1:
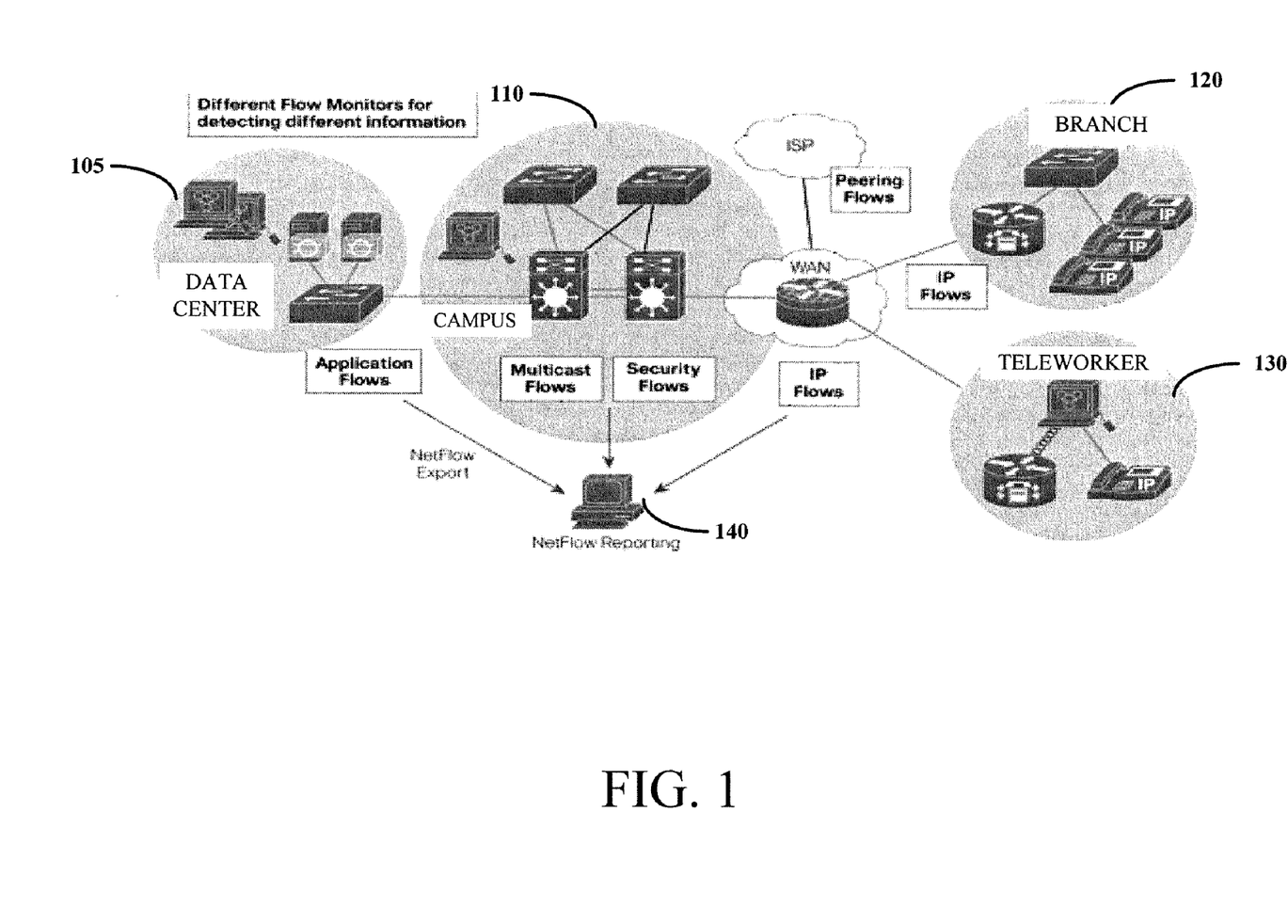
FIG. 1 illustrates an exemplary system for network flow sampling according to one embodiment of the invention.

FIG. 1 illustrates an exemplary system for network flow sampling according to one embodiment of the invention. A different type of flow monitoring can be implemented at each of the network devices according to resource capabilities and need. Three exemplary embodiments are described herein. In FIG. 1, NetFlow Reporting element 140 serves as an external collector that receives flow information reported by each of the other network devices. The flows can be of different types. Data center 105 reports application flows to NetFlow Reporting element 140. Campus element 110 reports multicast flows and security flows to NetFlow Reporting element 140. Branch 120 and teleworker 130 report IP flows through a wireless access network to NetFlow Reporting element 140. Along with the reporting on the flows, the network devices may also report on the particular parameters used to determine which flows are reported. For example, if a network device reports on flows that contain more than 1 million packets, this network device would report on these flows to NetFlow Reporting element 140 and additionally indicate to NetFlow Reporting element 140 that the flows being reported on are those that contain more than 1 million packets. NetFlow Reporting element 140 can then use the flow information for usage-based accounting, traffic profiling, traffic engineering, attack or intrusion detection, and QoS monitoring as needed.

Figure 2:
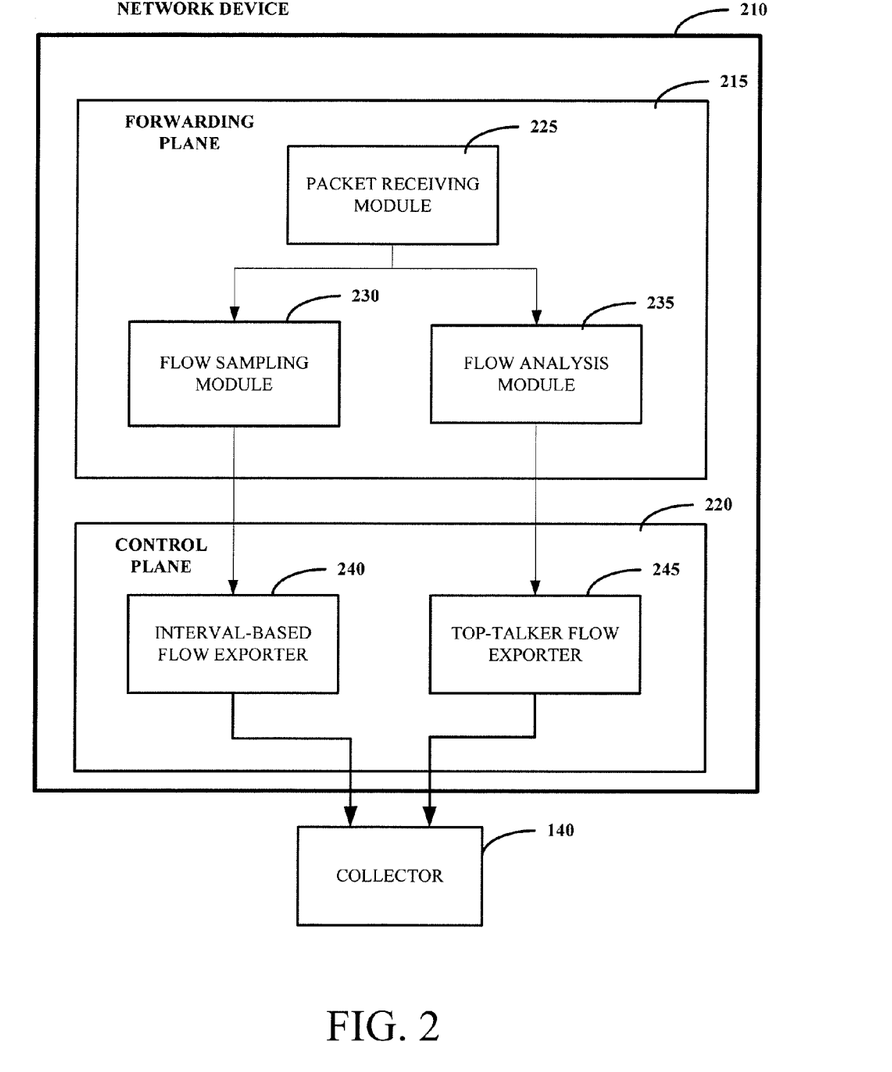
FIG. 2 illustrates an exemplary network device according to one embodiment of the invention.

FIG. 2 illustrates an exemplary network device according to one embodiment of the invention. This embodiment samples flows in two ways. One, by sampling based on flow intervals and two, by identifying the top talkers. The reporting result to collector 140 is a fixed number of flows from the random sampling (e.g., 10 random flows out of every 100 flows) and a variable number of flows depending on how many flows meet the predetermined top talker criterion. These records are reported on separate collector streams.

Network device 210 includes modules on forwarding plane 215 and control plane 220. Forwarding plane 215 includes packet receiving module 225, flow sampling module 230, and flow analysis module 235. Packet receiving module 225 receives packets and determines flows from the packets. Flows are defined as a unidirectional stream of packets that share a group of packet characteristics, such as Source IP address, destination IP address, source port for UDP or TCP, 0 for other protocols, destination port for UDP or TCP, type and code for ICMP, or 0 for other protocols, IP protocol, ingress interface (SNMP ifIndex), and IP Type of Service. Flow sampling module 230 and flow analysis module 235 identify respective samples from the flows. Flow sampling module 230 identifies a first subset of the flows based on random flow interval sampling. Flow analysis module 235 identifies a second subset of flows by analyzing every one of the flows to determine whether they are top talkers or heavy hitters. A predetermined criterion defines what a top talker or heavy hitter is. For example, one or more conditions are set that define top talkers with respect to a total number of packets in the flow, a total number of bytes in the flow, a number of packets per second in the flow, a number of bytes per second in the flow, and a lifetime of the flow.

Upon a flow's expiration, it is reported to control plane 220 if it was identified as a sample by flow sampling module 230 and/or a top talker by flow analysis module 235. Flow sampling module 230 reports the information of the first subset to interval-based flow exporter 240 and flow analysis module 235 reports the information of the second subset to top-talker flow exporter 245. These two exporters export the respective information to external collector 140 through separate collector streams. If a particular flow is a top talker and also happened to be identified as one of the flows to be sampled, information of this flow would be reported to collector 140 through both collector streams. Furthermore, these two exporters 240, 245 also report the criterion used to identify their respective subsets to collector 140. This way, the collector knows what conditions were used to select the reported flows.

Figure 3:
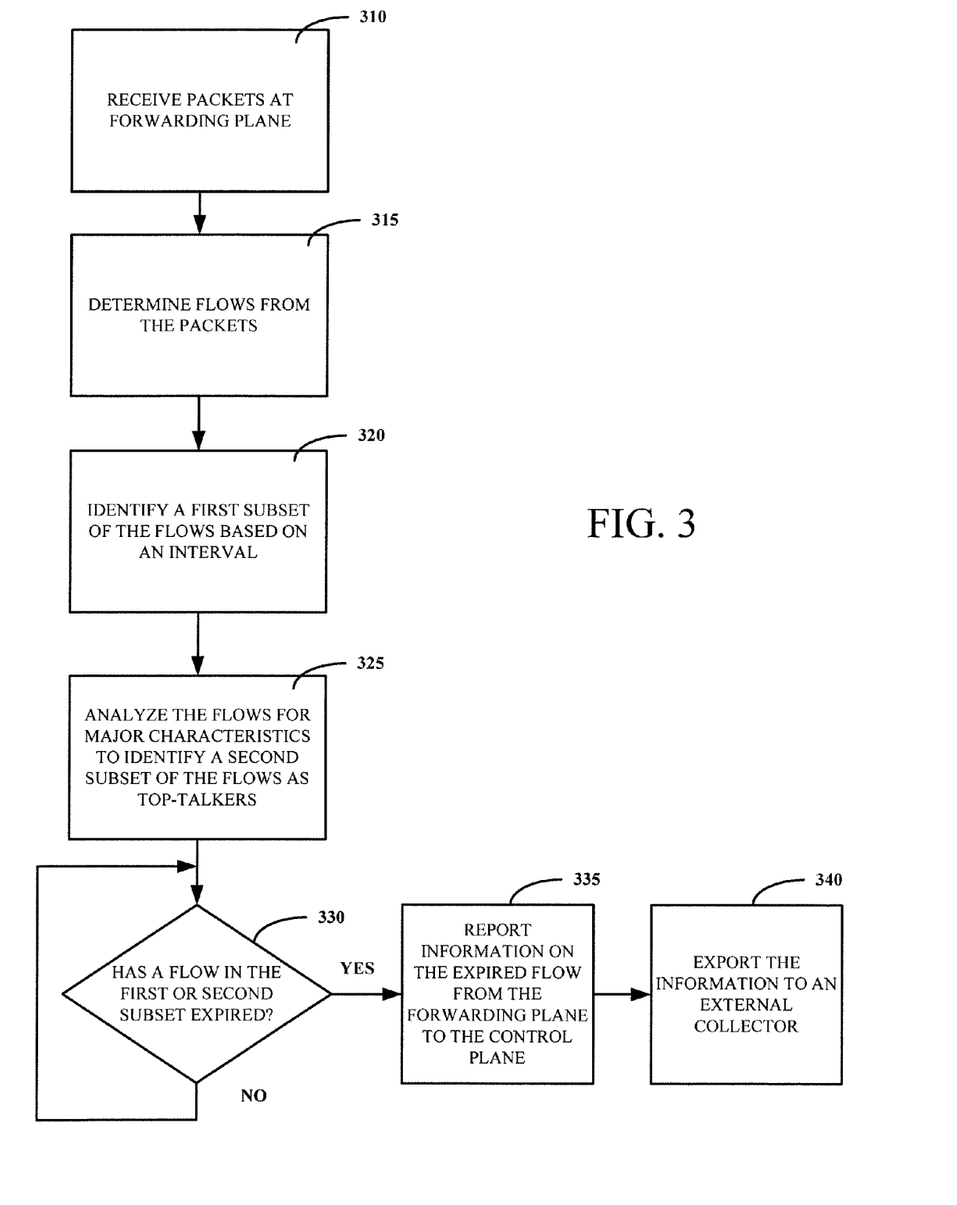
FIG. 3 is a data flow diagram of a network device according to one embodiment of the invention.

FIG. 3 is a data flow diagram of a network device according to one embodiment of the invention. The operations of FIG. 3 will be described with reference to the exemplary embodiment of FIG. 2. However, it should be understood that the operations of flow diagrams can be performed by embodiments of the invention other than those discussed with reference to FIG. 2, and the embodiments discussed with reference to FIG. 2 can perform operations different than those discussed with reference to the flow diagrams.

Beginning at 310, network device 210 receives packets at packet receiving module 225 of forwarding plane 215. Packet receiving module 225 determines flows from the received packets at operation 315. Flow sampling module 230 analyzes these flows to identify a first subset of the flows based on a flow sampling interval at operation 320. For example, an interval may be 1 flow out of every 100 flows. Flow analysis module 235 also analyzes these flows to identify a second subset of the flows according to a predetermined criterion at operation 325. The predetermined criterion includes one or more conditions that define a flow as a top talker or heavy hitter. At operation 330, a determination is made whether any of the flows has expired. If the expired flow is one of the flows identified by flow sampling module 230 in the first subset or flow analysis module 235 in the second subset, then the respective module reports information on the expired flow to control plane 220 (operation 335). Flow sampling module 230 reports to interval-based flow exporter 240 and flow analysis module 235 reports to top-talker flow exporter 245. These exporters export the information on separate collector channels to external collector 140, along with information that indicates how the reported flows were selected (operation 340). In this embodiment, regular flow based sampling is combined with top talker analysis so that flows that most impact traffic are sure to be reported.

Figure 4:
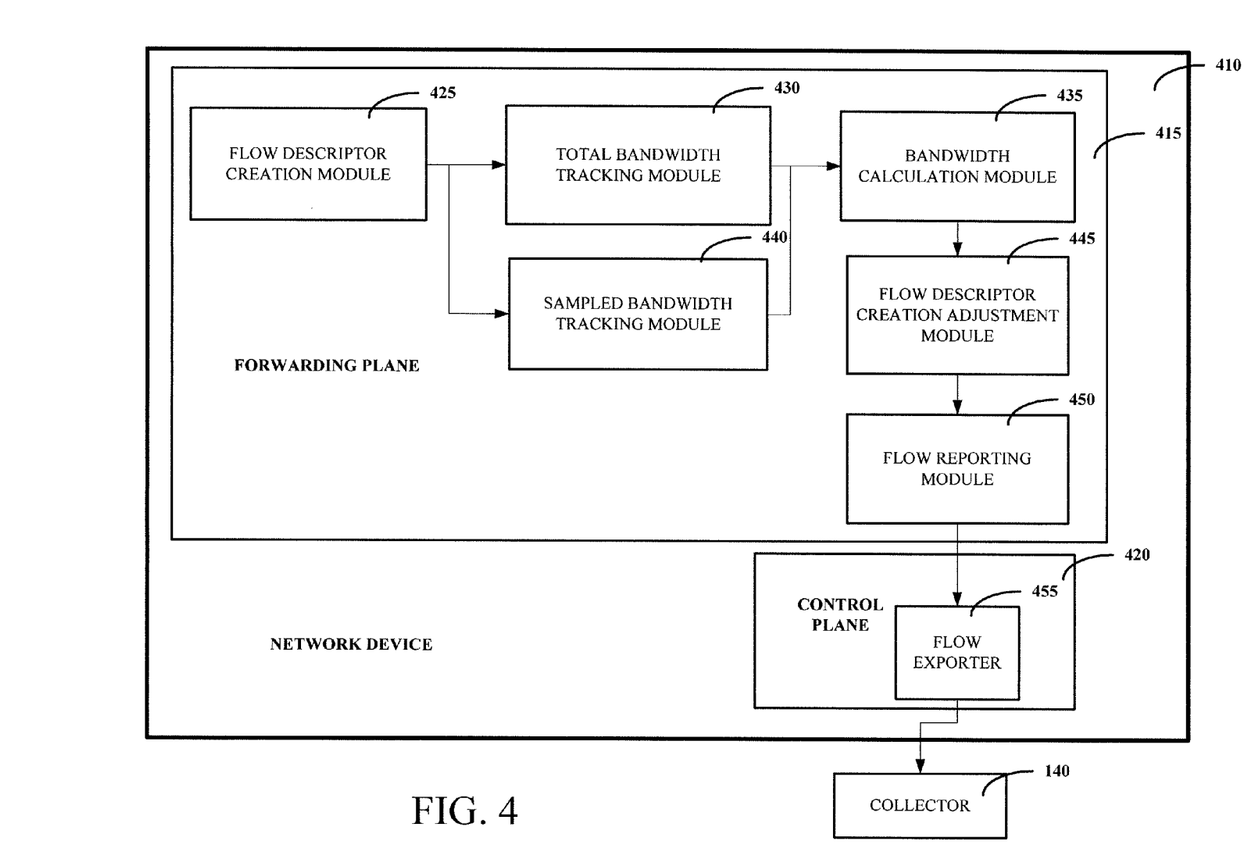
FIG. 4 illustrates an exemplary network device according to one embodiment of the invention.

FIG. 4 illustrates an exemplary network device according to one embodiment of the invention. In this embodiment, network device 410 samples flows based on bandwidth analysis. The reporting result is N flows that aim to capture most of the bandwidth. Various modules work together to measure and calculate bandwidth utilization so that flow sampling measures can be adjusted accordingly.

In forwarding plane 415, flow descriptor creation module 425 receives packets during a sampling time interval and creates a flow descriptor for each of the flows. Two elements of bandwidth tracking are directed to the flows. Total bandwidth tracking module 430 measures the total bandwidth consumed by the flows represented by all the flow descriptors during the sampling time interval, such as one second. Sampled bandwidth tracking module 440 measures the total bandwidth consumed by an initialized subset of flows. This subset of flows can be, for example, 100 randomly selected flows. The measurements taken by both these tracking modules is provided to bandwidth calculation module 435, which determines bandwidth utilization by the subset in terms of a percentage value. This is calculated by dividing the bandwidth of the subset of flows by the total bandwidth consumed by all the flows. The result is compared to a predetermined threshold value. This threshold value is a goal in terms of bandwidth percentage that should be captured by the subset. For example, a threshold value may be to have a subset of flows that captures 70% of the bandwidth of all flows. If the calculated result of bandwidth calculation module 435 achieves this goal, then flow descriptor creation adjustment module 445 maintains that initialized value of number of flows in the subset for the next sampling time interval, e.g., the next second. If the goal is not met, then flow descriptor creation adjustment module 445 increases the number of flows considered as the subset for the next sampling time interval. For example, if 100 flows were initially taken as the subset, but only consume 50% of the bandwidth, the next time interval may take 150 flows in an attempt to see if 150 flows would capture at least 70% of the bandwidth.

Flow reporting module 450 reports flow information of expired flows to flow exporter 455 of control plane 420. Flow exporter 455 exports the flow information to external collector 140. It is noted that even if the bandwidth goal is not met, an expired flow in the subset would still be reported out. In addition, a maximum value may be preset to limit the number of total flow descriptors that flow descriptor creation module 425 is permitted to create. For example, the number of flow descriptors may be limited to 1 million flows. If this maximum number of flows is met, then flow descriptor creation module 425 is not permitted to create another flow descriptor. However, if a new packet arrives and a new flow descriptor needs to be created, flow descriptor creation module 425 can then identify one of the flow descriptors in the subset of least bandwidth. After this flow descriptor is discarded, a new flow descriptor can be created for the incoming packet without the total number of flow descriptors exceeding the 1 million maximum. This configuration accepts new packets that could potentially be a part of flows that consume a great amount of bandwidth when the total limit of flow descriptors has been met.

Figure 5:
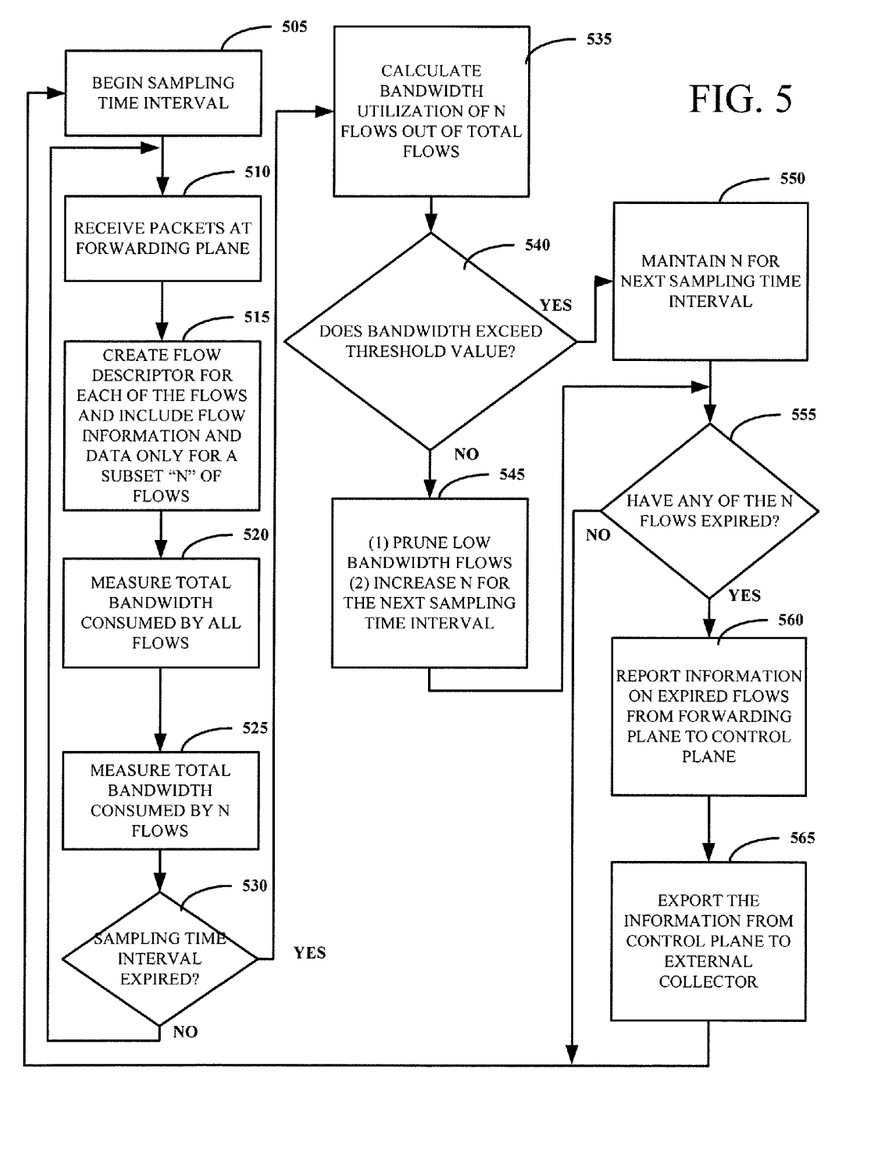
FIG. 5 is a data flow diagram of a network device according to one embodiment of the invention.

FIG. 5 is a data flow diagram of a network device according to one embodiment of the invention. The operations of FIG. 5 will be described with reference to the exemplary embodiment of FIG. 4. However, it should be understood that the operations of flow diagrams can be performed by embodiments of the invention other than those discussed with reference to FIG. 4, and the embodiments discussed with reference to FIG. 1 can perform operations different than those discussed with reference to the flow diagrams.

Starting with operation 505, a sampling time interval such as one second begins. At 510, network device 410 receives packets at forwarding plane 415. At 515, flow descriptor creation module 425 creates flow descriptors for every flow but includes flow information (to be reported later) only for a subset "N" of flows. At operation 520, network device 410 measures total bandwidth consumed by all flows and at operation 525, network device 410 measures total bandwidth consumed by N flows. If the sampling time interval of for example one second has expired, the method proceeds to operation 535 where network device 410 calculates bandwidth utilization of the N flows out of the total number of flows. If this bandwidth utilization value exceeds a predetermined threshold value (operation 540), then the value of N will be maintained for the next sampling time interval, such as for the next second (operation 550). If the threshold value is not met, then N will be increased to a higher value for the next sampling time interval (operation 545). In one embodiment, low bandwidth flows are pruned so as to make room for potentially high bandwidth flows in the next interval.

At operation 555, network device 410 determines whether any of the N flows have expired. If so, then information on these expired flows is reported by flow reporting module 450 to control plane 420 (operation 560). This information is then exported to external collector 140 (operation 565). In addition, flows can be reported even if they do not expire according to other conditions. For instance, a time limit can be set for the flows such that if the flows exceed this time limit, then they will be reported even though they have not expired. This may be referred to as active timeout to insure that these long flows are reported. Furthermore, inactive timeout refers to flows that have not received a new packet in a set amount of time and therefore are "aged out" and reported.

Figure 6:
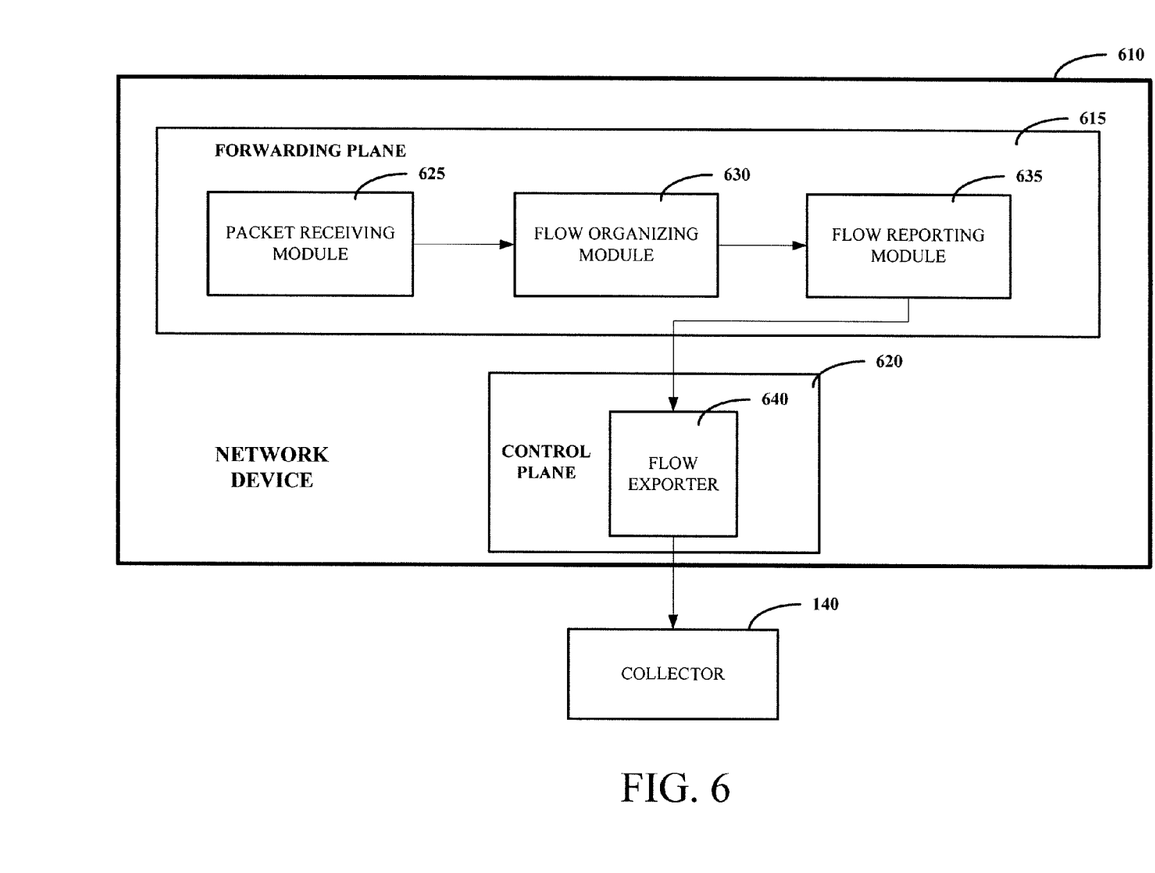
FIG. 6 illustrates an exemplary network device according to one embodiment of the invention.

FIG. 6 illustrates an exemplary network device according to one embodiment of the invention. This embodiment employs flow sampling based on buckets organized by a top talker criterion. The capacity of all of the buckets combined is capped at a value of "M" number of flows. If the capacity M has been reached, this embodiment drops one low talker flow to accommodate a new flow. The reporting result is a number of flows up to M. If the total number of flows is fewer than M, then all flows may be reported. In one embodiment, all flows are reported when the number of flows is fewer than M. In another embodiment, all flows do not need to be reported even though the number of flows is fewer than M. Instead, flows are reported based on given criterion, such as a top talker criterion of minimum number of packets in the flow. Similarly, if the total number of flows exceeds M, then up to M top talker flows are reported. In one embodiment, M flows are reported when the number of flows exceeds M. In another embodiment, only those flows that meet a predetermined criterion are reported, such as a minimum number of bytes in the flow. For these criteria, a variety of top talker definitions can be used. Network device 610 in this embodiment utilizes various modules to organize the flows into these virtual buckets.

Forwarding plane 615 includes packet receiving module 625 to receive packets and send them to flow organizing module 630. Flow organizing module 630 includes a plurality of buckets to organize the packets. This module determines whether a received new packet is part of an existing flow already tracked in one of the plurality of buckets. If so, then module 630 adds that new packet to the existing flow already tracked in one of the buckets. If the new packet is not part of an existing flow already tracked in a bucket, then module 630 first determines whether the total number of flows tracked in these buckets has reached a maximum limit. If the maximum limit has not been met, then a new flow is created in a bucket. If the maximum limit has been met, then module 630 needs to discard one of the flows to allow a new flow to be created. Module 630 selects an insignificant flow to be discarded so that top talkers remain tracked. Details of flow organizing module 630 are described with reference to subsequent FIGS. 7 and 8.

Flow reporting module 635 reports the information of the flows tracked in the plurality of buckets upon their expiration. If a flow was discarded by flow organizing module 630, it is no longer tracked by the buckets and therefore would not be reported when it expires. This embodiment of tracking through top talker buckets ensures that information on the top talkers is reported up to the maximum limit of flows permitted to be tracked. In the event that fewer than the maximum number of flows is tracked, then all flows would be reported. Flow exporter 640 of control plane 620 exports the information on the reported flows to external collector 140.

Figure 7:
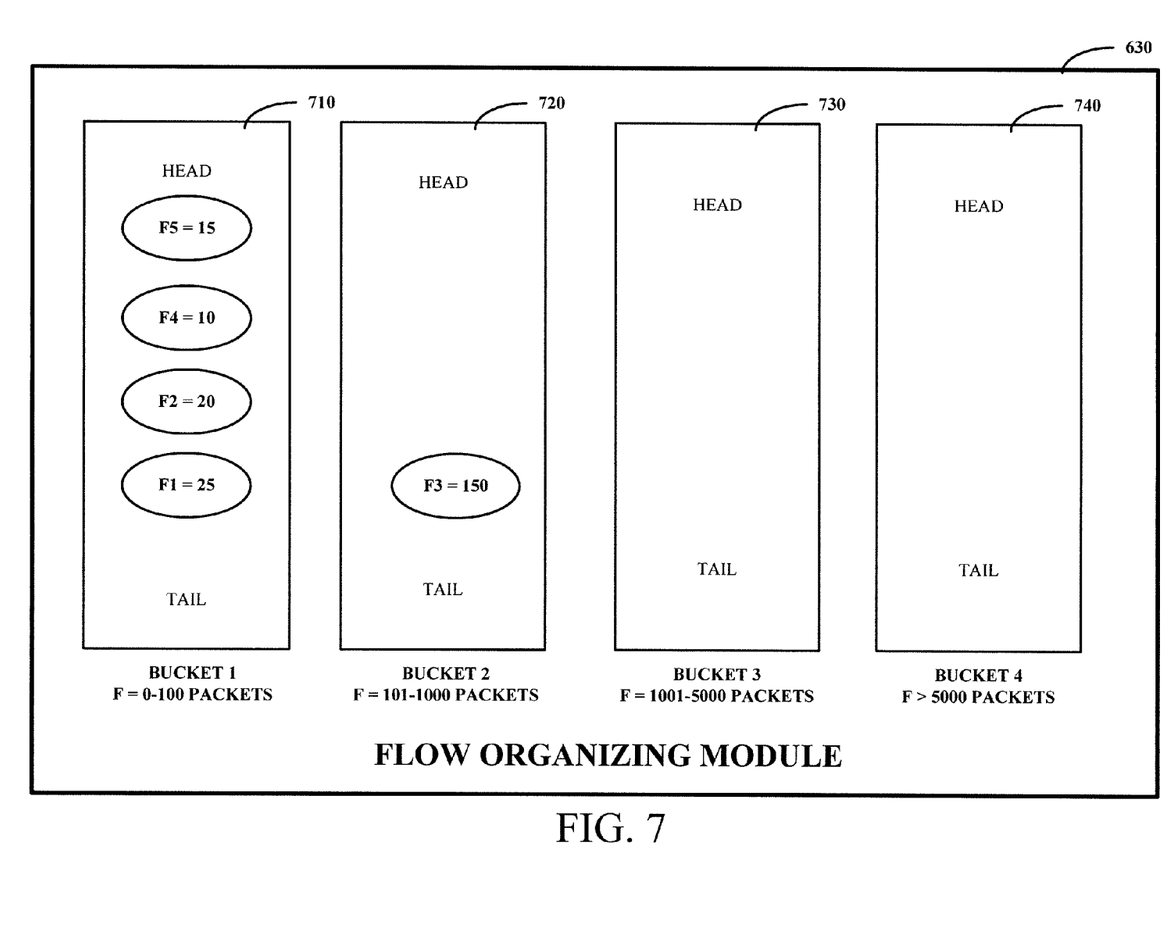
FIG. 7 illustrates an exemplary module in the network device of FIG. 6 according to one embodiment of the invention.

FIG. 7 illustrates an exemplary module in the network device of FIG. 6 according to one embodiment of the invention. FIG. 7 depicts a detailed view of flow organizing module 630 and the buckets contained therein by way of specific example. Here, flow organizing module 630 includes 4 buckets 710, 720, 730, 740. It is noted that the number of buckets may be fewer or more depending on resources and preferences of a particular network device.

As illustrated, the head of the buckets is at the top and the tail is at the bottom. In each of the buckets, the most recently used flow is at the head and the least recently used flow is at the tail of each bucket. In this example, the bucket 1 710 contains flows of packets from 0-100, bucket 2 720 contains flows of packets from 101-1000, bucket 3 730 contains flows of packets from 1001-5000, and bucket 4 740 contains flows of packets more than 5000 in number. Accordingly, these buckets consider number of packets to be the condition by which top talker flows are defined. As discussed earlier, top talkers can be defined by other aspects instead.

In one example, packets are received for flows in order of F1, F2, F3, F4, and F5. Since F5 was most recently used, it is at the head of bucket 1. Since F1 was least recently used, it is at the tail of bucket 1. In the event that a flow is to be discarded, F1 would be discarded because it is the least recently used flow of the least-significant bucket. Flows with a number of packets up to 100 are tracked in bucket 1 710. It is noted that flow F3 includes 150 packets and therefore is tracked in bucket 2 720 is further noted that flow F3 must have began in bucket 1 710 because all new flows are created with just one packet. As packets are added to the existing tracked flows, they move up to other buckets. If a new flow is subsequently inserted into bucket 2 710, would go in through the head of the bucket and in this illustration would be positioned above F3. Bucket 3 730 for flows containing 1001-5000 packets and bucket 4 740 for flows containing more than 5000 packets are empty at the moment because no flows contain that many packets yet. The next figure will illustrate the flow positions when new packets are received by network device 610 in an example.

Figure 8:
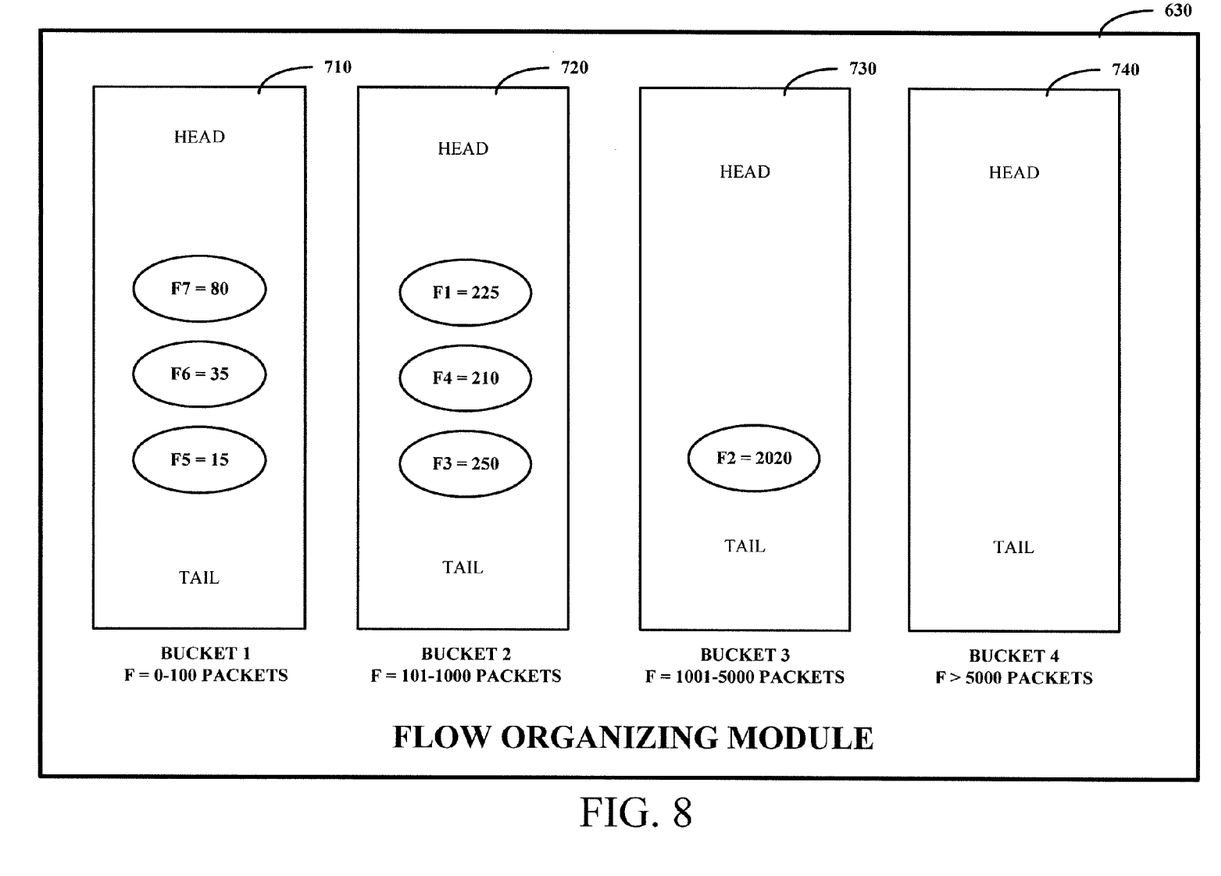
FIG. 8 illustrates an exemplary module in the network device of FIG. 6 according to one embodiment of the invention.

FIG. 8 illustrates an exemplary module in the network device of FIG. 6 according to one embodiment of the invention. FIG. 8 depicts a detailed view of flow organizing module 630 and the buckets contained therein by way of specific example. FIG. 8 is the end result of flows in buckets after the progression from FIG. 7 when new packets are received in the following order: F3 receives 100 packets, then F4 receives 200 packets, then F2 receives 2000 packets, then F1 receives 200 packets, then 35 packets for new flow F6 are received, and 80 packets for new flow F7 are received. FIG. 8 is best understood when viewed with FIG. 7.

The first event is flow F3 receives 100 packets. As shown in FIG. 7, F3 used to contain 150 packets. FIG. 8 shows F3 containing 100+150=250 packets and since F3 is still the only flow in bucket 2 720, it remains in the same position. The second event is flow F4 receives 200 packets. F4 used to contain 10 packets according to FIG. 7 and now contains 210 packets. F4 now contains too many packets to qualify under bucket 1 710. Bucket 2 720 is for flows with 101-1000 packets and F4, which contains 210 packets, is moved out of bucket 1 710 and inserted at the head of bucket 2 720, which is just above F3. The next event is F2 receives 2000 packets. F2 used to contain 20 packets. As new packets were added, F2 was bumped up to the head of bucket 2 720 as well. Then, when F2 exceeded 1000 packets, it was bumped out of bucket 2 720 and into bucket 3 730 which is for flows containing 1001-5000 packets. F2 is now the only flow in bucket 3 730. The next event is F1 receives 200 packets. F1 used to have 25 packets and now has 225 packets. Therefore, it fits in bucket 2 720 and is inserted at the head of bucket 2, right above F4.

Now, new packets are received for flows that do not yet exist in any of the buckets. First, 35 packets for new flow F6 are received. A flow for F6 is created upon the first new packet, and the remaining 34 packets are added to that flow. F6 contains 35 packets and sits at the head of bucket 1, right above F5. Then, 80 packets for new flow F7 are received. Analogous to F6, new flow F7 is created and resides at the head of bucket 1710 because it contains 80 packets. In the example of FIG. 8, the maximum number of flows permitted to be tracked by buckets is more than 7. For this reason, no flows needed to be discarded when the first packet for new F6 and the first packet for new F7 were received.

If the maximum number of flows permitted to be tracked was 7, a new packet for flow that is not F1-F7 would be handled differently. Before a new flow for this packet can be created, an existing flow must first be discarded. The flow to be discarded is the flow that lies at the tail of the least significant bucket, bucket 1 710. Continuing with this example, F5 would be discarded to allow for new F8 to be created. Bucket 4 740 remains empty because no flows have more than 5000 packets. When any of the flows in any of the buckets expire, those are the flows that are reported to control plane 620, and then to collector 140.

Figure 9:
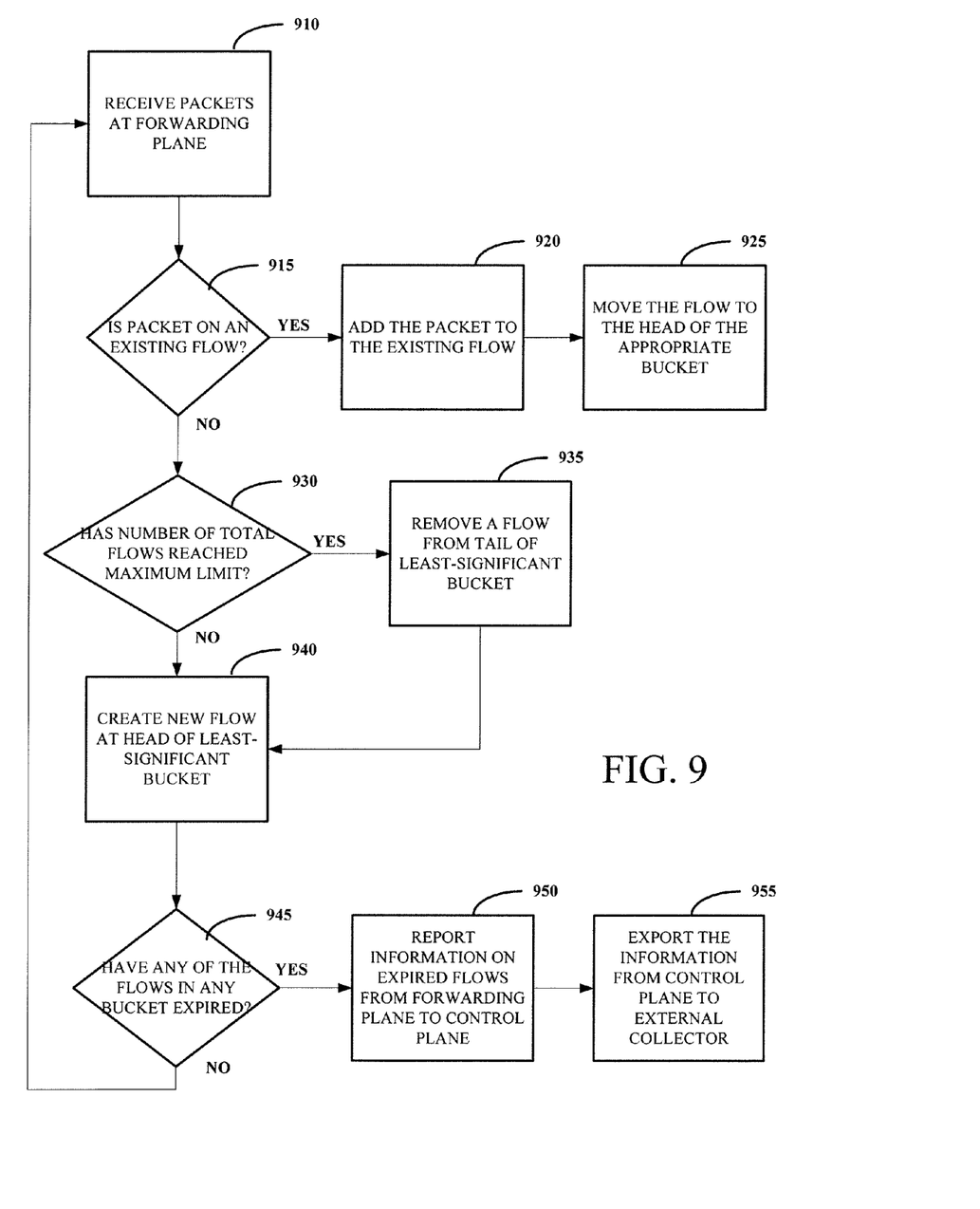
FIG. 9 is a data flow diagram of a network device according to one embodiment of the invention.

FIG. 9 is a data flow diagram of a network device according to one embodiment of the invention. The operations of FIG. 9 will be described with reference to the exemplary embodiment of FIGS. 6-8. However, it should be understood that the operations of flow diagrams can be performed by embodiments of the invention other than those discussed with reference to FIGS. 6-8, and the embodiments discussed with reference to FIGS. 6-8 can perform operations different than those discussed with reference to the flow diagrams.

Beginning with operation 910, network device 610 receives packets at forwarding plane 615. Packet organizing module 630 checks to see if the packet is on a flow already tracked in buckets (operation 915). If so, packet organizing module 630 adds this packet to the existing flow (operation 920). The flow that just increased in packet size is moved to the head of the appropriate bucket according to the parameters that define top talkers (operation 925). If the new packet is not on any of the flows tracked in the buckets, then another check is performed to see if the number of total flows tracked in the buckets has reached a maximum limit (operation 930). If so, then the flow that lies at the tail of the least significant bucket is discarded to make room for a new flow (operation 935). If the maximum limit has not been reached, network device 610 is permitted to create a new flow at the head of the least significant bucket (operation 940). For now, this new flow contains just one packet. As new packets are received on this flow, it may move to another bucket.

At operation 945, network device 610 determines whether any of the flows in any of the buckets have expired. When flows expire, information on these flows are reported to control plane 620 (operation 950) and then exported to collector 140 (operation 955).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network device for performing sampling-based monitoring of flows in a plurality of buckets, the method comprising the steps of:
    receiving a packet at a forwarding plane of the network device;
    determining whether the packet is part of an existing flow already tracked in one of the plurality of buckets ranging from a least-significant bucket to a most-significant bucket in terms of a predetermined criteria that identifies top talkers, wherein the top talkers are the flows that most impact traffic of the network device, wherein each of the plurality of buckets sort the flows tracked therein by order of least recently used at a tail of each bucket and most recently used at a head of each bucket;
    upon determination that the packet is part of the existing flow already tracked in one of the plurality of buckets, performing the following steps:
        adding the packet to that existing flow; and
        moving that existing flow to the head of a bucket of the plurality of buckets, the bucket for that existing flow is selected based on the predetermined criteria;
    upon determination that the packet is not part of any existing flows already tracked in one of the plurality of buckets, performing the following steps:
        determining whether a total number of flows tracked in the plurality of buckets of the forwarding plane has reached a maximum limit;
        discarding a flow from the tail of the least-significant bucket only when the total number of flows in the plurality of buckets of the forwarding plane has reached a maximum limit, whereby the flow is discarded to allow a new flow to be created without causing the total number of flows to exceed the maximum limit and because the flow to be discarded is the least recently used flow in the least-significant bucket; and
        creating a new flow for the packet at the head of the least-significant bucket;
    reporting information on the flows tracked in the plurality of buckets upon the flows' expiration from the forwarding plane to a control plane of the network device,
        wherein the information includes at least one of source IP address, destination IP address, source port number, destination port number, number of packets in the flow, number of bytes in the flow, time of first packet of the flow, or time of last packet of the flow, whereby reporting only the information on those flows that remain tracked in any of the plurality of buckets by not being discarded upon the flows' expiration ensures that information on the top talkers is reported and also guarantees that information on at least one flow is reported because all flows created by the network device are reported up to the maximum limit; and exporting the information on the flows reported to the control plane from the control plane to an external collector for further analysis or processing by the external collector.

2. The method of claim 1, wherein the predetermined criteria that identifies the top talkers is based on at least one of a total number of packets in the flow, a total number of bytes in the flow, a number of packets per second in the flow, a number of bytes per second in the flow, or a lifetime of the flow.

3. The method of claim 2, wherein each of the plurality of buckets is designated for flows containing a different predetermined range of packets.

4. The method of claim 3, wherein the least-significant bucket is designated to track flows containing a lowest number of packets and the most-significant bucket is designated to track flows containing a highest number of packets.

5. A network device for performing sampling-based monitoring of flows in a plurality of buckets, comprising:

a forwarding plane having memory and CPU including:
  a packet receiving module to receive a packet;
  a flow organizing module having the plurality of buckets, the flow organizing module to determine whether the packet is part of an existing flow already tracked in one of the plurality of buckets ranging from a least-significant bucket to a most-significant bucket in terms of a predetermined criteria that identifies top talkers, wherein the top talkers are the flows that most impact traffic of the network device, wherein each of the plurality of buckets sort the flows tracked therein by order of least recently used at a tail of each bucket and most recently used at a head of each bucket, wherein upon determination that the packet is part of the existing flow already tracked in one of the plurality of buckets, the flow organizing module to add the packet to that existing flow and move that existing flow to the head of a bucket of the plurality of buckets, the bucket for that existing flow is selected based on the predetermined criteria, and wherein upon determination that the packet is not part of any existing flows already tracked in one of the plurality of buckets, the flow organizing module to determine whether a total number of flows tracked in the plurality of buckets of the forwarding plane has reached a maximum limit, discard a flow from the tail of the least-significant bucket only when the total number of flows in the plurality of buckets of the forwarding plane has reached a maximum limit, whereby the flow is discarded to allow a new flow to be created without causing the total number of flows to exceed the maximum limit and because the flow to be discarded is the least recently used flow in the least-significant bucket, and create a new flow for the packet at the head of the least-significant bucket; and a flow reporting module to report information on the flows tracked in the plurality of buckets upon the flows' expiration from the forwarding plane to a control plane, wherein the information includes at least one of source IP address, destination IP address, source port number, destination port number, number of packets in the flow, number of bytes in the flow, time of first packet of the flow, or time of last packet of the flow, whereby reporting only the information on those flows that remain tracked in any of the plurality of buckets by not being discarded upon the flows' expiration ensures that information on the top talkers is reported and also guarantees that information on at least one flow is reported because all flows created by the network device are reported up to the maximum limit; and the control plane having memory and CPU including:
  a flow exporter to export the information on the flows reported to the control plane from the control plane to an external collector for further analysis or processing by the external collector.

6. The network device of claim 5, wherein the predetermined criteria that identifies the top talkers is based on at least one of a total number of packets in the flow, a total number of bytes in the flow, a number of packets per second in the flow, a number of bytes per second in the flow, or a lifetime of the flow.

7. The network device of claim 6, wherein each of the plurality of buckets is designated for flows containing a different predetermined range of packets.

8. The network device of claim 7, wherein the least-significant bucket is designated to track flows containing a lowest number of packets and the most-significant bucket is designated to track flows containing a highest number of packets.

* * * * *

UNITED STATES PATENT AND TRADEMARK OFFICE
CERTIFICATE OF CORRECTION

PATENT NO. : 8,335,160 B2
APPLICATION NO. : 12/750499
DATED : December 18, 2012
INVENTOR(S) : Carvalho et al.

Page 1 of 1

It is certified that error appears in the above-identified patent and that said Letters Patent is hereby corrected as shown below:

On the title page, item (75), under "Inventors", in Column 1, Line 3, delete "Sa Jose, CA (US);" and insert -- San Jose, CA (US); --, therefor.

In Column 6, Line 1, delete "(VOID)" and insert -- (VOIP) --, therefor.

In Column 6, Line 9, delete "etc.)." and insert -- etc.), --, therefor.

In Column 6, Line 15, delete "(e.g." and insert -- (e.g., --, therefor.

In Column 6, Line 20, delete "(e.g." and insert -- (e.g., --, therefor.

In Column 6, Line 47, delete "residents" and insert -- residential --, therefor.

In Column 12, Line 42, delete "720 is" and insert -- 720. It is --, therefor.

Signed and Sealed this
Second Day of April, 2013

Teresa Stanek Rea
*Acting Director of the United States Patent and Trademark Office*